United States Patent [19]

Taylor

[11] Patent Number: 4,475,244
[45] Date of Patent: Oct. 2, 1984

[54] TIME-PERIOD MODULATION TRANSMISSION SYSTEM

[75] Inventor: Thomas M. Taylor, 415 Arlington, Dr., SE., Calgary, Canada, T2H 1S4

[73] Assignees: John A. Neal; Thomas M. Taylor, both of Los Angeles, Calif.

[21] Appl. No.: 465,649

[22] Filed: Feb. 10, 1983

[51] Int. Cl.³ .............................................. H03C 3/00
[52] U.S. Cl. .................................. 455/42; 332/16 R; 358/144; 381/3; 381/16; 375/49
[58] Field of Search ...................... 455/42, 44, 46, 47, 455/63, 202, 214, 295, 337, 110, 112; 332/16 R, 23 R; 381/3, 15, 16; 375/49, 62; 329/110, 126; 328/150, 151; 358/144

[56] References Cited

U.S. PATENT DOCUMENTS

| | | | |
|---|---|---|---|
| 2,697,745 | 12/1954 | Halstead | 178/5.8 |
| 2,851,532 | 9/1958 | Crosby | 179/15 |
| 3,046,329 | 7/1962 | Reesor | 178/5.6 |
| 3,069,505 | 12/1962 | Collins et al. | 179/15 |
| 3,686,431 | 8/1972 | Kitaoka et al. | 178/5.8 R |
| 3,805,192 | 4/1974 | Ocnaschek et al. | 332/16 R |
| 3,824,498 | 7/1974 | McBride | 375/62 X |
| 4,079,204 | 3/1978 | Takahashi et al. | 179/15 |
| 4,328,554 | 5/1982 | Mantione | 375/62 X |

OTHER PUBLICATIONS

"Stereophonic Sound for Television", Ronald K. Jurgen, Senior Editor, IEEE Spectrum, Sep. 1982, pp. 30-33.

*Primary Examiner*—Robert L. Griffin
*Assistant Examiner*—Albert W. Watkins
*Attorney, Agent, or Firm*—Freilich, Hornbaker, Rosen & Fernandez

[57] ABSTRACT

A system for time-period modulating (TPM) a subcarrier in accordance with the amplitude of an input signal includes generating a ramp signal of constant slope, comparing the ramp signal with the input signal, and resetting the ramp signal when the ramp signal reaches the input signal. Each time the ramp signal is reset, a clock pulse is counted. These clock pulses are counted in cyclic groups of N. After each clock pulse is counted, the then attained count is converted to a value of a sinusoid about some reference. The values for each of N counts define one sinusoidal cycle of the modulated subcarrier. Converting these values to voltage levels produces a sinusoidal stepwave which has a period linearly proportional to the amplitude of the input signal at the time. At a receiver, demodulation of the signal is achieved by squaring each cycle of the TPM signal, and during a predetermined half cycle of each squarewave cycle, generating a ramp signal of constant slope which reaches a voltage level in one half cycle linearly proportional to the period of the TPM cycle. The voltage level attained in each demodulating half cycle is sampled and held until the next demodulating half cycle. In that manner, a step waveform is generated which follows the input signal to the modulator at the transmitter. This system may be used for the L−R signal of a monaural compatible stereophonic transmission system which combines an L+R signal with the TPM L−R signal. The composite is then modulated on a carrier.

10 Claims, 7 Drawing Figures

TIME-PERIOD MODULATION TRANSMISSION SYSTEM

BACKGROUND OF THE INVENTION

This invention relates to a method and apparatus for time-period modulation (TPM) of a sinusoidal signal, such as a subcarrier for transmitting an audio signal, particularly in a stereophonic system of the compatible stereo-monaural type which combines left (L) and right (R) audio signals in the main channel as the sum (L+R) and in an auxiliary channel as the difference (L−R). A receiver equipped to detect the TPM difference (L−R) as well as the sum (L+R) can recover the left (L) and right (R) signals, while a receiver equipped to detect only the sum (L+R) will recover the complete audio program.

Although the present invention has immediate application transmitting stereophonic audio signals for television, it will be readily apparent to those skilled in the art of communications that the TPM technique will have other applications. However, because of its advantages over FM, which is the prior-art standard for stereophonic radio transmission, and which has been incorporated in three stereophonic transmission systems that have been proposed for television, the TPM technique will have its greatest application in stereophonic television.

For a summary of the proposed FM stereophonic television systems, and the performance objectives of any stereophonic television system, see a review by Ronald K. Jurgen, Senior Editor of IEEE Spectrum, September 1982, pp. 30-33 titled "Stereophonic sound for television" wherein "three transmission systems, vying for selection as the U.S. standard," are compared. The performance objectives include:

1. The L+R stereophonic system, as employed in FM stereo radio, should be used with signal-to-noise ratio and distortion equal to or better than the existing broadcast monophonic TV channel.
2. The dynamic range of the stereophonic system should not be limited by the dynamic characteristic of the monophonic signal.
3. A separate audio channel should be available for possible bilingual use.
4. Automatic switching should be available from a monaural mode to the stereo mode, as well as switching to bilingual channels, when more than monophonic sound is being received.
5. Auxiliary services should be accommodated (which implies providing auxiliary channels).
6. The use of compatible audio signal processors to improve the dynamic range and signal-to-noise ratio should be allowed.

While it is expected that all three FM stereophonic modulating systems proposed will meet at least the first two of these objectives, the present invention will meet all of the objectives, and some with improved performance. The most important is lower distortion and higher signal-to-noise ratio.

In frequency modulation of a carrier or a subcarrier, there is phase distortion at the high end of the frequency spectrum, particularly in high frequency, high level sound. The theory of FM modulation is that a carrier at a given center frequency is so modulated with an input audio signal that ideally the carrier frequency deviates in linear proportion to the audio signal. At the receiver, the FM signal is then detected to produce a voltage that is proportional to the amount of frequency deviation. The problem is that FM detector circuits of the integrating type actually measure time periods (T) of the FM cycles (except in the case of phase-lock loop discriminators). While it is true that frequency is equal to 1/T, a measurement of the time period shift, $\Delta T$, of the frequency modulated carrier equal to $1/\Delta f$ is a "1 over X" function, which is known to be not linear. As a consequence, conversion of the audio signal to frequency shift of the carrier at the transmitter, and then converting the frequency shift to time period shift at the receiver, inherently introduces distortion. To avoid this distortion, it is possible to introduce a compensation function that is proportional to the measured time period, but the compensation circuit would be complex.

Another aspect of the distortion in an FM system is the problem of a sudden change in the audio signal, such as that present in the attack of an instrument or voice, which should produce a corresponding shift in frequency. However, the reactance in the frequency modulator will not permit such sudden changes. The higher frequency is reached only over several cycles of the carrier during which there is an averaging effect from cycle to cycle. The problem can be compared to trying to make a sudden change in the RPM of a flywheel.

The TPM technique of the present invention allows a sudden change in cycle period to be made from one cycle to the next of the carrier in direct proportion to the amplitude of an audio signal. At the receiver, the period is measured to recover the audio signal. This not only avoids the flywheel effect in modulating, but also avoids the nonlinearity (1 over X function) of FM which results from the carrier frequency being changed in modulation, while the change in carrier period is detected in demodulation. This improvement is achieved in the present invention because the carrier period is changed in modulation, and the change in carrier period is detected in demodulation.

SUMMARY OF THE INVENTION

In accordance with the present invention, time period modulation (TPM) of a subcarrier is employed, for transmission of a signal on a carrier. This is achieved by comparing the input signal voltage with a linear ramp, and emitting a clock pulse when the ramp exceeds the input signal voltage to reset the ramp generator. The period between clock pulses is thus a function of the input signal amplitude. The slope of the ramp is selected to produce a center frequency of clock pulses equal to $Nf_c$, where $f_c$ is the desired carrier frequency, e.g., 31.5 kHz in the case of a subcarrier for television transmission, and N is a number of samples (comparisons) desired per cycle of the subcarrier. Each clock pulse resets the ramp generator and triggers a modulo-N counter. The digital output of the counter is converted to a sinusoidal signal each cycle of which is of a constant amplitude and of a period equal to that of the corresponding cycle of the counter. The result is a TPM sinusoidal signal at a center frequency $f_c$.

This conversion of the counter output to a sinusoidal signal may be achieved by, for example, using the output of the counter to address a read-only memory (ROM) in which predetermined values of the sinusoidal signal have been stored. These values are then converted from digital to analog form and filtered through a suitable bandpass filter coupling the converted signal to a transmitter. The time-period modulator thus produces a cycle of the sinusoidal signal at the center frequency $f_c$ having a period linearly proportional to the amplitude of the input signal.

If the subcarrier frequency is significantly higher than the input signal, such as greater than about 100 times the input frequency, the amount of error caused by the input signal amplitude varying during the period of one subcarrier cycle is insignificant. However, when that is not the case, such as when the input signal has a frequency of 15 kHz and the subcarrier has a frequency of 31.5 kHz for television transmission, a sample-and-hold circuit may be employed at the input of the time period modulator to avoid any such error. This sample-and-hold circuit is controlled by the output of the modulo-N counter such that, as the counter recylces, another sample of the input signal is taken and held until N more clock pulses have been counted. This assures two samples per cycle of the input signal on a subcarrier at center frequency twice the input frequency, which satisfies Nyquist's sampling theorem which states that two samples per cycle of the input signal will completely characterize a band-limited input signal.

The input signal to the time-period modulator may be from a stereophonic sound system of the compatible stero-monaural type, in which case it is chosen to be the lower frequency (L−R) signal. The TPM subcarrier is mixed with the higher frequency (L+R) signal for transmission on a carrier. At the receiver, the TPM modulated subcarrier is separted from the L+R signal for demodulation. The TPM modulated signal is first processed through a squaring circuit. During one half of each square waveform cycle, a linear ramp generator is operated to generate a linearly increasing voltage during the period of the half cycle. At the beginning of the next half cycle, that voltage is sampled and held, and the process is repeated. The output of the sample-and-hold circuit is thus a signal which follows the L−R signal. The detected L+R signal is then combined with the detected L−R signal to produce the respective sum [(L+R)+(L−R)=2L] and difference [(L+R)−(L−R)=2R] signals, in a conventional manner.

The novel features of the invention are set forth with particularity in the appended claims. The invention will best be understood from the following description when read in conjunction with the accompanying drawings.

DESCRIPTION OF PREFERRED EMBODIMENTS

Figure 1:
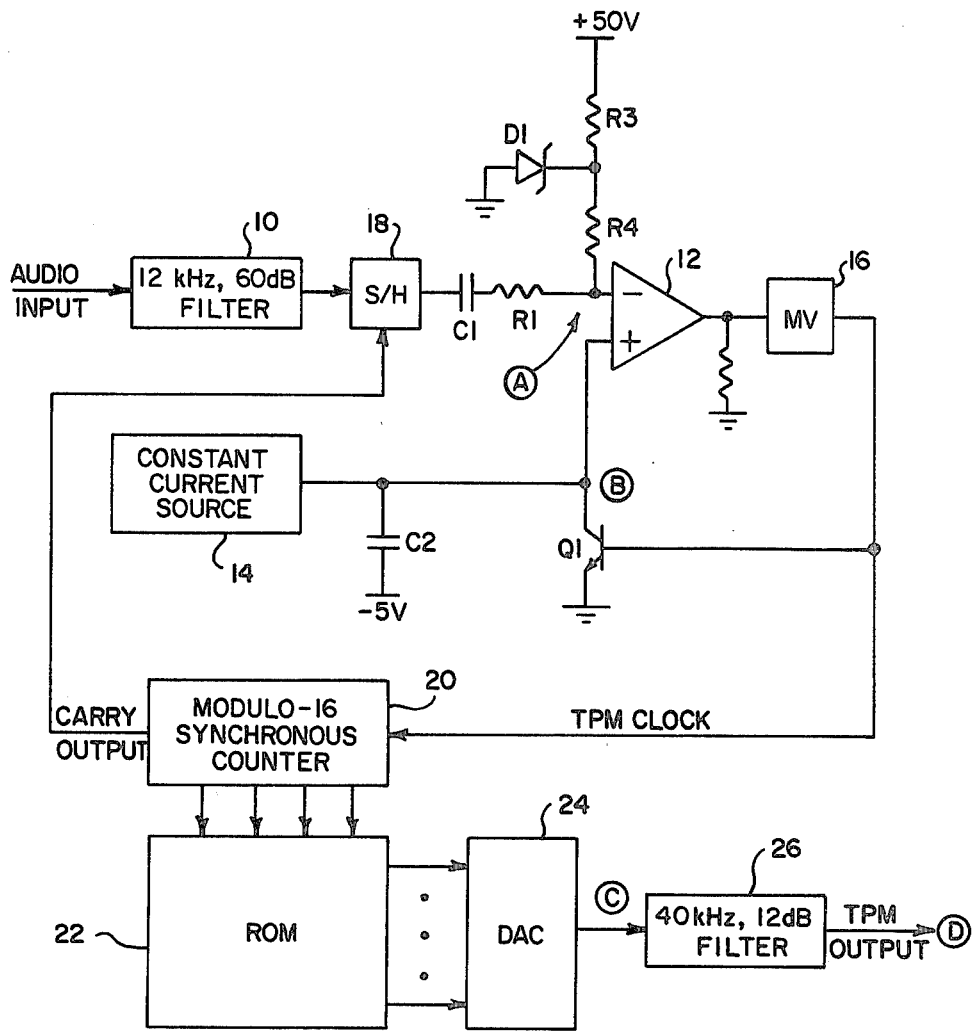
FIG. 1 illustrates a time-period modulator (TPM).

Referring now to FIG. 1, an audio input signal for television transmission is first passed through a fourth order elliptical low-pass (12 kHz, 60 db) filter 10 to prevent aliasing, i.e., prevent frequency components greater than half the sampling frequency from producing audible components at the receiver. A capacitor C1 and resistor R1 couple the filter to the inverting input of an operational amplifier 12 via a sample-and-hold circuit 18 used as a comparator. Resistors R3 and R4 cooperate with a Zener diode D1 to bias the inverting input of the amplifier 12 at a desired stable positive voltage (7.2 V).

The amplifier 12 compares the amplitude of the audio input signal with a positive linear ramp signal generated by a capacitor C2 charged with current from a constant current source 14. The capacitor charges linearly until the ramp voltage at the noninverting input of the amplifier 12 exceeds the level of the audio signal at the inverting input terminal. Then the positive transition of the amplifier output triggers a monostable multivibrator 16 which emits a short pulse (100 ns) to clear the voltage of the capacitor C2 through a transistor Q1. Although shown as NPN transistor, the transistor Q1 is preferably an integrated circuit designed for use as a buffer with an open collector output terminal, such as a TTL buffer.

Operation of the circuit described thus far will produce clock pulses out of the multivibrator 16 at a frequency of N times a center subcarrier frequency, $f_c$, where N is a number of samples (comparisons) desired per cycle of the subcarrier, and the center frequency is selected to have at least two samples per cycle of the highest audio frequency. Assuming, for example, an audio signal of 15 kHz, the center frequency may be 31.5 kHz, and assuming that 16 samples of the audio signal at 15 kHz are made per cycle of the subcarrier, the center frequency of the TPM output is 504 kHz. That center frequency is established by proper selection of the slope of the ramp generator, i.e., by adjusting the size of the capacitor C2 and/or adjusting the constant current source.

When the subcarrier frequency is significantly higher than the audio signal frequency, such as 100 times higher, the amount of error caused by the audio signal amplitude varying during one subcarrier cycle is insignificant. But when the subcarrier frequency is only twice that of the audio signal, the audio signal amplitude may vary significantly within a cycle of the carrier. Since two samples per cycle of the audio signal are sufficient to satisfy Nyquist's sampling theorem, which states that two samples per cycle will completely characterize a band-limited signal, the error referred to above can be avoided by placing the sample-and-hold circuit 18 at the input of the operational amplifier 12 under control of a modulo-16 (4-bit binary) synchronous counter 20. Synchronous operation of all four stages of the counter is provided by having all stages clocked simultaneously so that the four outputs change coincident with each other in response to a TPM clock pulse. A synchronous carry output is generated internally by the counter with a gate which detects the 1111 state and transmits the next TPM clock pulse as a carry output at the same time the counter is recycled to the 0000 state. In that manner, every 16th clock pulse counted which resets the counter to zero is transmitted to the sample-and-hold circuit 18 to cause it to store a new sample of the audio input signal. The counter will thus recycle at a center frequency $f_c$, which is chosen to be 31.5 kHz for the subcarrier in a television stereophonic transmission system to be described with reference to FIG. 3. Since that is twice the highest frequency of the audio input, Nyquist's theorem is satisfied.

The four binary outputs of the modulo-16 counter are used to access a read-only memory (ROM) 22 that has been programmed to produce sixteen successive values of a sinusoidal waveform at its 8-bit output. For example, at the count of four clock pulses, the value may be a predetermined positive peak value with respect to a reference (mid value); at the count of eight clock pulses, the value is then zero with respect to that reference (i.e., at mid value); at the count of twelve clock pulses, the value is a predetermined negative peak value with respect to the reference equal in magnitude to the positive peak value; and at the count of sixteen clock pulses, when the counter recycles, the value is again zero. These sixteen successive values are converted from digital to analog form by a digital-to-analog converter (DAC) 24. The output of the DAC is thus a step waveform which follows a sinusoid with each individual cycle having its period modulated by the amplitude of the audio input signal. That sinusoidal step waveform is smoothed by a low-pass (40 kHz, 12 dB) filter 26 to produce the TPM modulated output that is to be transmitted.

Figure 2:
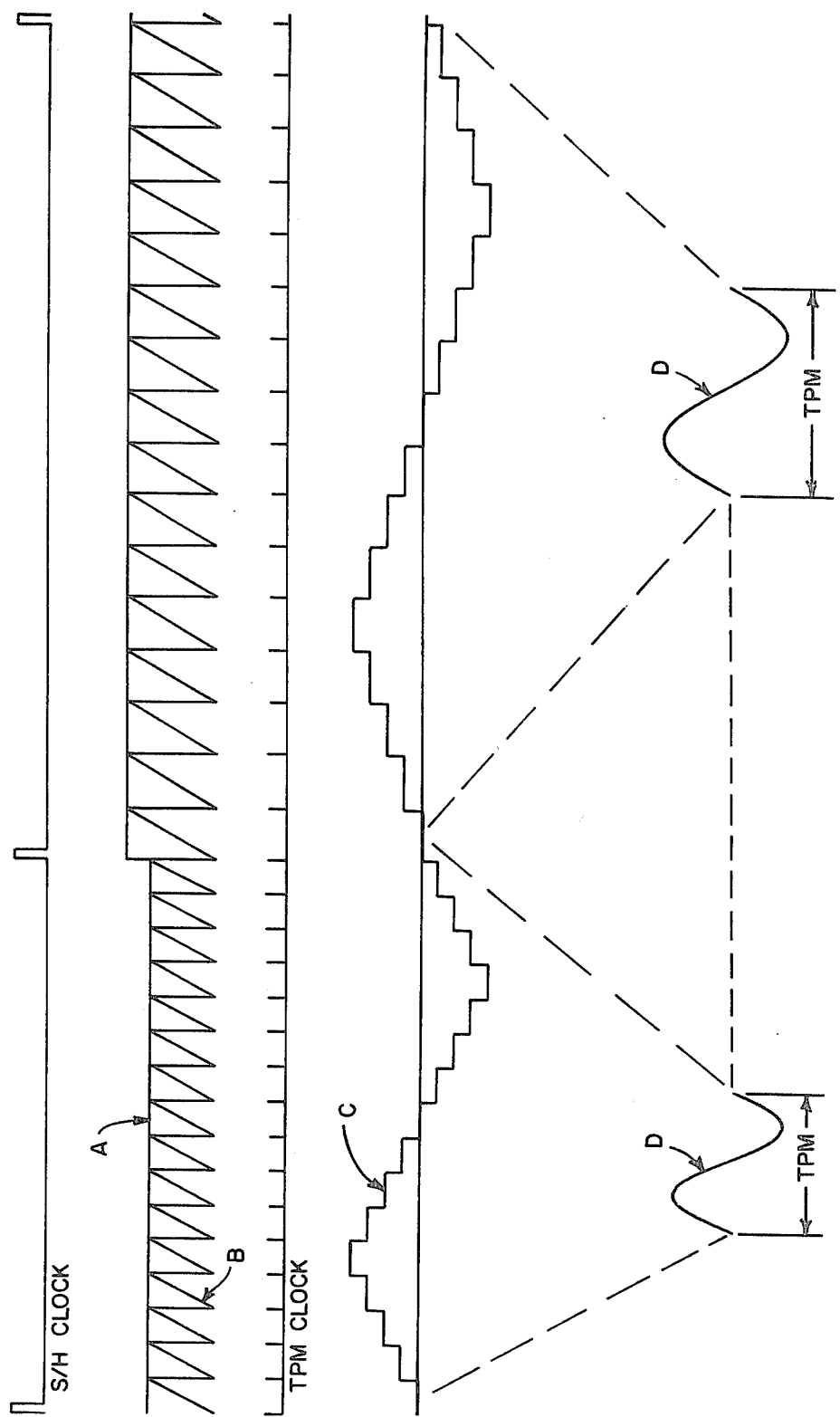
FIG. 2 illustrates waveforms useful in understanding the TPM of FIG. 1.

FIG. 2 illustrates the operation of the TPM modulator in FIG. 1. The waveforms shown are signals at points indicated in FIG. 1 by circled letters corresponding to the letters identifying the waveforms. The input signal is assumed to be varying at a rate sufficient to require the sample-and-hold circuit 18. The sampled audio signal is thus shown at a constant level by the waveform A for a period of 16 TPM clock pulses from the multivibrator 16. The ramp signal B is reset each time it reaches the sampled audio signal level to trigger the multivibrator 16. TPM clock pulses thus generated are counted, and in response to the sixteenth, the synchronous carry output pulse from the modulo-16 counter 20 triggers the sample-and-hold circuit 18.

An increase in the audio signal level is shown in FIG. 2 for the first part of a subsequent sample-and-hold period. All TPM clock pulses during a sample-and-hold period, i.e., during sixteen TPM clock pulses, are generated with the same period, i.e., with a constant pulse repetition rate. If the sample-and-hold circuit 20 were not used, any variation of the audio input level during the period of sixteen TPM clock pulses would produce a variation of the interpulse pulse period. From the following description, it will become evident that the TPM subcarrier generated would then vary from the pure sinusoidal waveform, and thus produce some error in the detected audio signal at the receiver. The sample-and-hold circuit prevents that error.

As the modulo-16 counter responds to the TPM clock pulses, its output addresses the ROM to produce at the output of the ROM sixteen successive values, in digital form, of one cycle of a sinusoidal waveform at a fixed amplitude. These values are then converted to analog form by the DAC 24. The resulting step waveform C is smoothed by a filter 26 to produce a cycle of a sinusoidal waveform D, which is a single cycle of the subcarrier. As noted hereinbefore, the center frequency of that subcarrier may be selected by an adjustment in the slope of the ramps in waveform B. Once adjusted, that slope is maintained constant so that as the signal amplitude of the audio input increases, the clock pulse period increases, thus increasing the time period of the next TPM subcarrier cycle. Similarly, if the audio input decreases, the clock pulse period of the TPM clock decreases, to decrease the period of the next cycle of the TPM subcarrier.

Figure 3:
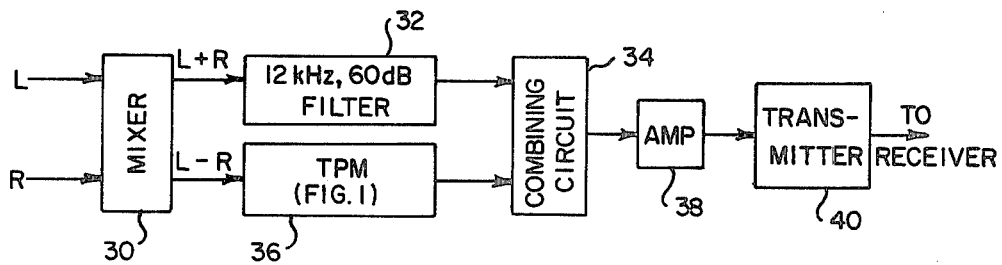
FIG. 3 illustrates a functional block diagram of a transmission system for stereophonic sound suitable for television transmission.

Application of the TPM shown in FIG. 1 to stereophonic television transmission will now be described with reference to FIG. 3 which illustrates a general block diagram of the audio portion of a typical transmitting station, and FIG. 4 which illustrates a general block diagram of the audio portion of a typical receiving station. Referring first to FIG. 3, two stereophonic signals, L and R, from two spaced microphones (or the equivalent) are applied to a conventional four-port mixer 30 which generates output frequencies at one output equal to the sum (L+R) and at the other output equal to the difference (L−R) of the two input frequencies. The sum signal is coupled by a low-pass (12 kHz, 60 dB) filter 32 to a conventional combining circuit 34 having two input ports and a common output port. This three-port circuit combines the separate input signals linearly in the desired proportion to produce an output signal which is essentially the 31.5 kHz signal from a time-period modulator 36 superimposed on the low frequency audio signal passed by the filter 30. Such a three port circuit may be implemented in a conventional way with an operational amplifier configured as a voltage adding circuit by a feedback resistor connected to its inverting input terminal, and two summing resistors coupling the signals to be combined to the inverting input terminal in accordance with the following equation:

$$E_o = R_o((E_1/R_1) + (E_2/R_2))$$

where $R_o$ is the feedback resistor, $R_1$ is the coupling resistor for one input signal $E_1$, and $R_2$ is the coupling resistor for the other input signal $E_2$. Selection of the resistors $R_1$ and $R_2$ allows scaling of each input signal before adding. For example, the TPM signal may be scaled down to a fraction of about one tenth of the other signal. The composite signal [(L+R)+(L−R)] is coupled by a differential balanced output amplifier (24 dB, 500 to 600 ohms output impedance) to a transmitter 40 at the transmitter a carrier is modulated and the modulated carrier is applied to a power amplifier for transmission.

Figure 4:
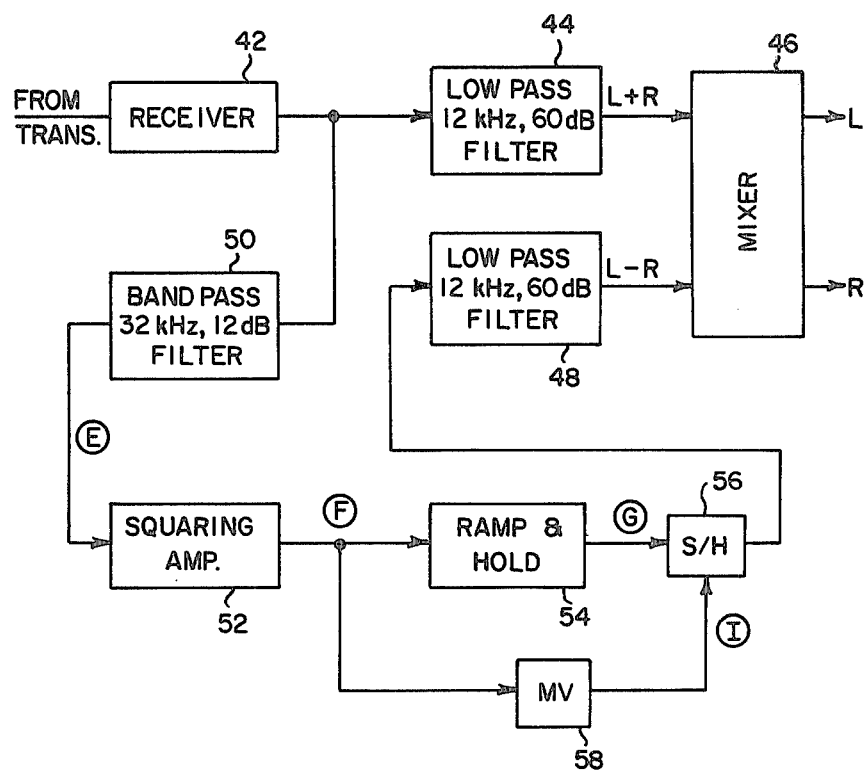
FIG. 4 illustrates a functional block diagram of a receiver for the stereophonic sound system of FIG. 3.

At the receiving station shown in FIG. 4, a receiver 42 receives the transmitted signal and recovers the baseband from the carrier. The baseband component (L+R) is passed through a low-pass (12 kHz, 60 dB) filter 44 to one input terminal of a four-port mixer 46 that generates output frequencies equal to the sum and difference of two input frequencies. The other input to the mixer is the signal (L−R) passed by a similar filter 48 from a circuit for demodulating the TPM subcarrier separated from the baseband by a bandpass filter 50. The demodulating circuit is comprised of a squaring circuit 52, a ramp-and-hold circuit 54 and a sample-and-hold circuit 56 triggered by the squaring circuit through a multivibrator 58.

The bandpass filter 50 couples the TPM subcarrier to the squaring circuit 52 and rejects the signal L+R, just as the filter 44 passes the signal L+R, and rejects the TPM subcarrier. The bandpass filter 50 is preferably designed as a two-stage variable, bandpass amplifier. The first stage serves as an input buffer to the TPM demodulator as well as a filter to separate the TPM subcarrier from the signal L+R. The second stage further filters the TPM subcarrier.

It should be noted that the signal L+R may be used by monaural receivers. In that sense, this TPM stereophonic system is compatible with monaural receivers, just as the FM stereophonic systems are intended to be compatible, and for the same reason, namely that the signal L+R is readily separated by a low-pass filter from a modulated subcarrier. In a stereophonic receiver having the appropriate subcarrier demodulator, a mixer produces the sum and difference of the signals (L+R) and (L−R), which results in the stereophonic signals L and R. (The arithmetic implies an amplitude multiplying factor of 2 for each, but in practice scaling the outputs of the mixers in audio amplifiers that follow removes that factor from consideration.)

Figure 5:
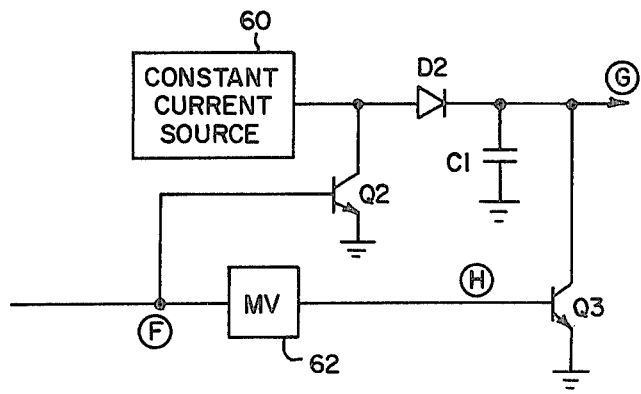
FIG. 5 illustrates a TPM detector.

The squaring circuit 52 squares the TPM cycles of the subcarrier, and shifts the waveform level so that its transitions are between zero and a positive voltage. Following that, transient response compensated discrimination (demodulation) is accomplished by the ramp-and-hold circuit 54 and the sample-and-hold circuit 56. FIG. 5 illustrates an implementation for the ramp-and-hold circuit 54 using a constant current source 60 and capacitor C3. The positive half cycle of the squarewave input turns a transistor switch Q2 on to shunt current from the constant current source, thus preventing any further charging of the capacitor. The trailing edge (negative transition) of the squarewave input then triggers a monostable multivibrator 62 which emits a 100-ns pulse to turn on a transistor Q3 to discharge the capacitor C3. (Transistors Q2 and Q3 are each preferably implemented as an integrated circuit designed for use as a buffer with an open collector output terminal like transistor Q1.) Immediately following, the capacitor again charges linearly. The voltage level reached during the next half cycle is thus linearly proportional to the time period of a half cycle of the TPM carrier. The multivibrator 58 (FIG. 4) is triggered on the leading (positive transition) of the squared subcarrier waveform. It emits a sample pulse to the sample-and-hold circuit 56 so that the voltage level reached by the ramp-and-hold circuit 54 shown in FIG. 5 is sampled and held until the next sample pulse. In that manner, the output of the sample-and-hold circuit 55 is a step waveform which conforms to the audio signal (R−L) that was time-period modulated at the transmitter.

Figure 6A:
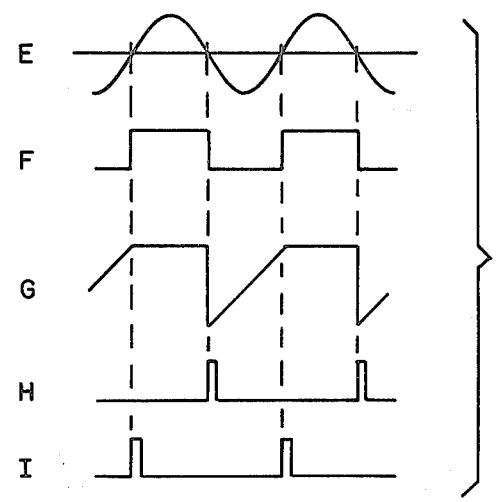
FIGS. 6a and 6b illustrate waveforms useful in understanding two equivalent embodiments of the TPM detector of FIG. 5.

FIG. 6a illustrates operation of the TPM demodulator by waveforms at points in FIGS. 5 and 6a indicated by circled letters corresponding to the waveforms in FIG. 6. Each cycle of the TPM subcarrier shown in waveform E is converted to a squarewave of equal period, as by a saturating class B amplifier. The squarewave is shown by waveform F. While the squarewave is down (zero) negative, it cuts off transistor Q2 to allow constant current from source to charge the capacitor C3 in the ramp-and-hold circuit. When it is positive, it turns transistor Q2 on to shunt current, thus ending the ramp. Diode D2 acts as a switch to hold the charge of the capacitor C3 during the following half cycle. The trailing edge (negative transition of a squarewave pulse triggers the multivibrator 62 to produce a 100-ns pulse shown in waveform H that turns on the transistor Q3. That resets the ramp-and-hold circuit automatically for the next TPM subcarrier cycle. Meantime, the multivibrator 62 is triggered on the leading (positive transition) of a squarewave pulse to sample the level of the ramp-and-hold circuit during the first half of the next TPM cycle to produce a pulse shown in waveform I. In that manner, the first half of each TPM cycle is used to hold for sampling the level of the last cycle, and the second half of each TPM cycle is used for detecting time period. This has the advantage that any change in time period from one cycle to the next has an opportunity to settle by the time of the second half of the cycle so that more accurate time period detection can be made, i.e., so that perterbations from one cycle to the next do not interfere with TPM detection.

Figure 6B:
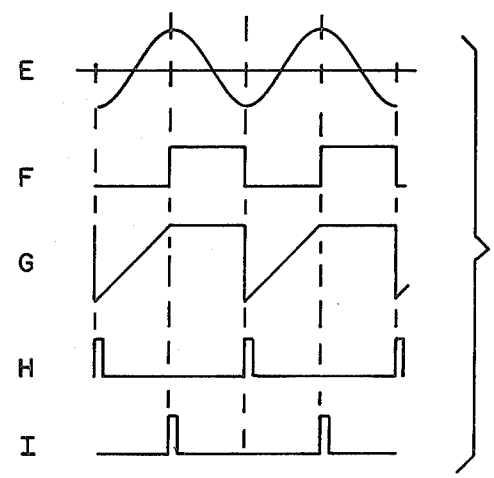

A circuit used for squaring the TPM signal, as just described above, has a disadvantage in that any drift in the dc reference of that TPM signal from the filter 50 will cause the squarewave output to depart from a symmetrical waveform of equal periods for both halves of each cycle. That would introduce an error. Consequently, a preferred implementation for the squaring circuit is a slope detector which has the effect of shifting the squarewave signal 90° as shown in FIG. 6b. That shift is compensated in the TPM (FIG. 1) by programming the ROM to begin each TPM cycle with a peak maximum as shown in FIG. 6b. The circuit of FIG. 5 will operate in the same way, but with the advantage that any drift in the reference will not have any effect on the measurement of the time period of a TPM cycle over one half the cycle from 90° to 270°.

It is recognized that in some transient response limited transmission systems, such as an RF receiver with tuned IF stages, or a telephone system with steep roll off filters, the transition from a cycle of one time period to a new cycle of another time period becomes slurred. Any distortion of this transition point could produce a voltage error in the TPM discriminator, but in the preferred embodiment of the invention, this is minimized by using the second half (180° to 360°) or the middle half (90° to 270°) or the second half (180° to 360°) of each cycle for ramping (discrimination). After 180° or 90°, the TPM carrier and the system will have stabilized enough for discrimination.

Filter 40 (FIG. 4) is a 12 kHz, 60 dB filter designed to smooth the step waveform at the output of the sample-and-hold circuit 58. The filter 44 for the L+R signal not only serves to separate the TPM subcarrier from the L+R signal, but also to equalize the phase delay between the signal channels into the mixer 46. Upon mixing the signals, (L+R) and (L−R) to produce the sum and differences, the stereophonic signals L and R are retrieved from the system.

The exemplary embodiments have been described with reference to 31.5 kHz as the selected center frequency for the subcarrier. Since that is a harmonic of the horizontal sync pulse for NTSC television, that subcarrier frequency is a preferred choice. Otherwise beat frequencies between the harmonic of the horizontal sync and the subcarrier may produce audio frequencies within the band of the L+R signal. However, the present invention permits any choice of subcarrier frequency, such as 20 kHz. The choice of 20 kHz would be preferred for this system to avoid the problem stated above, since any beat frequencies between the subcarrier at 20 kHz and the horizontal sync harmonic of 31.5 kHz would be outside the band of the L+R signal. Since two samples (cycles of the subcarrier) are required for every cycle of the audio to satisfy Nyquist's sampling theorem, the audio bandwidth into the TPM must then be limited to 10 kHz. However, that bandwidth limit is adequate for most television receivers, particularly with conventional television audio power amplifiers and speaker systems.

It should be noted that the combining circuit 34 at the transmitter functions as a frequency division multiplexer for transmitting two signals over a common path by sending each one over a different frequency band, one over a baseband and the other over the subcarrier band. The receiver then demultiplexes the signals and processes each separately. Consequently, the TPM technique may be used for other purposes besides monaural transmission in place of FM, or compatible stereomonaural FM radio transmission. It may be used for transmission of an audio program in many languages, for example, and because it is a digital sampled data system, it can be readily used to transmit other channels of information by time division multiplexing without any loss of system performance other than division of available bandwidth. Such multiple channel applications may include, for example, not only bilingual audio programming for television, but also simultaneous transmission of information for auxiliary services.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. A method for modulating a subcarrier in accordance with the amplitude of an input signal comprising the steps of
    generating a ramp signal of constant slope,
    comparing said ramp signal with said input signal, and resetting said ramp signal when the ramp signal reaches the input signal,
    generating a clock pulse each time said ramp signal is reset,
    counting said clock pulses in cyclic groups of N,
    converting the then attained count of said clock pulse count after each clock pulse to a value of a sinusoid about some reference value, where a sequence of N values for one cycle of said clock pulse counts in one cycle of N clock pulses are predetermined to define one cycle of said modulated subcarrier, thereby producing a sinusoidal step waveform signal each cycle of which has a time period linearly proportional to the amplitude of the input signal, and
    smoothing the sinusoidal step waveform signal.

2. A method as defined by claim 1 including the step of sampling and holding the input signal while completing one cycle of a count of N clock pulses, and repeating the sample-and-hold step each time said count of said N clock pulses completes a cycle, thereby holding the input signal being compared with the ramp signal constant through N cycles of the ramp signal generation.

3. A method as defined by claim 1 or claim 2 in a radio communication system: comprising the further step of modulating a carrier signal with said subcarrier for transmission to receivers, and at each receiver carrying out the steps of
    recovering the time period modulated subcarrier from the modulated carrier,
    squaring each cycle of said subcarrier,
    using a predetermined half cycle of each squarewave cycle to generate a ramp signal of constant slope starting at a predetermined reference and reaching a voltage level linearly proportional to the period of said predetermined half cycle,
    sampling and holding said voltage level until the predetermined half cycle of the next subcarrier cycle, thereby producing a step waveform which follows the input signal time period modulated for transmission, and
    smoothing said step waveform to reproduce said input signal.

4. A method as defined in claim 3 wherein squaring each cycle is carried out by converting the subcarrier signal of one polarity with respect to a reference to a signal of one voltage level, and of opposite polarity with respect to said reference to a signal of another voltage level, and using the second half cycle of each square waveform to time said ramp signal, thereby allowing any perterbations in the period of received signal cycles from one cycle to the next to settle during the first half signal cycle before timing the ramp signal with the second half signal cycle of the received subcarrier.

5. A method as defined in claim 3 wherein squaring each cycle is carried out by detecting a change of slope in the subcarrier from negative to positive, and from positive to negative, to produce a squarewave which is of one level from 90° to 270° and of another level from 0° to 90° and from 270° to 360°, and using the half cycle from 90° to 270° to time the ramp signal, thereby allowing any perterbations in the period of received signal cycles from one cycle to the next to settle prior to the half cycle from 90° to 270° before timing the ramp signal with a half cycle of the received subcarrier.

6. Apparatus for modulating a subcarrier in accordance with the amplitude of an input signal comprising
    means for generating a ramp signal of constant slope,
    means for comparing said ramp signal with said input signal,
    means responsive to said comparing means for resetting said ramp generating means when the ramp signal reaches the input signal amplitude, and for generating a clock pulse each time said ramp signal is reset,
    a modulo-N counter for counting said clock pulses,
    means for converting the output of said modulo-N counter after each clock pulse to a value of a sinusoid about some reference value with a sequence of N values for one cycle of said modulo-N counter defining one modulated cycle of said subcarrier, thereby producing a sinusoidal step waveform signal, each cycle of which has a period linearly proportional to the amplitude of the input signal, and
    means for smoothing the sinusoidal step waveform signal.

7. Apparatus as defined by claim 6 including means for sampling and holding the input signal while said modulo-N counter completes one cycle, said sample-and-hold means being operated to sample and hold each time said modulo-N counter completes a cycle, thereby holding the input signal being compared with the ramp signal constant through N cycles of the ramp signal for each cycle of said modulo-N counter.

8. Apparatus as defined by claim 6 or claim 7 in a radio communication system comprising means for modulating a carrier signal with said subcarrier for transmission to receivers, and at each receiver a demodulator comprising
    means for recovering the time period modulated subcarrier from the modulated carrier,
    means responsive to squaring each cycle of said subcarrier starting at a predetermined point of each cycle for a square waveform cycle,
    means responsive to using a predetermined half cycle of each squarewave cycle for generating a ramp signal of constant slope starting at a predetermined reference and reaching a maximum voltage level linearly proportional to the period of said predetermined half cycle, means for sampling and holding said maxiaum voltage level until the predetermined half cycle of the next square waveform cycle, thereby producing a step waveform which follows the amplitude of the input signal time period modulated for transmission, and means for smoothing said step waveform to reproduce said input signal.

9. Apparatus as defined in claim 8 wherein said means for squaring each cycle is comprised of means for converting the subcarrier signal of one polarity with respect to a reference to a signal of one voltage level, and of opposite polarity with respect to said reference to a signal of another voltage level, and wherein the second half cycle of each square waveform is used to time said ramp signal, thereby allowing any perterbations in the period of received signal cycles from one cycle to the next to settle during the first half signal cycle before timing the ramp signal with the second half signal cycle of the received subcarrier.

10. Apparatus as defined in claim 8 wherein said means for squaring each cycle is comprised of means for detecting a change of slope in the subcarrier from negative to positive, and from positive to negative, to produce a squarewave which is of one level from 90° to 270° and of another level from 0° to 90° and from 270° to 360°, and wherein the half cycle from 90° to 270° is used to time the ramp signal, thereby allowing any perterbations in the period of received signal cycles from one cycle to the next to settle prior to the half cycle from 90° to 270° before timing the ramp signal with a half cycle of the received subcarrier.

* * * * *